(12) United States Patent
Bae

(10) Patent No.: US 9,221,108 B2
(45) Date of Patent: Dec. 29, 2015

(54) DRILL TOOL

(75) Inventor: Byung Gyun Bae, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 142 days.

(21) Appl. No.: 14/130,897

(22) PCT Filed: Jul. 19, 2012

(86) PCT No.: PCT/KR2012/005764
§ 371 (c)(1),
(2), (4) Date: Jan. 3, 2014

(87) PCT Pub. No.: WO2013/012266
PCT Pub. Date: Jan. 24, 2013

(65) Prior Publication Data
US 2014/0133931 A1    May 15, 2014

(30) Foreign Application Priority Data

Jul. 20, 2011    (KR) .......................... 10-2011-0072059

(51) Int. Cl.
| B23B 51/02 | (2006.01) |
| B23B 51/04 | (2006.01) |
| B23B 27/14 | (2006.01) |

(52) U.S. Cl.
CPC .............. *B23B 51/048* (2013.01); *B23B 27/141* (2013.01); *B23B 51/02* (2013.01);
(Continued)

(58) Field of Classification Search
CPC ...................... B23B 2251/50; B23B 2251/505; B23B 2251/285; B23B 51/0466; B23B 51/048; B23B 2251/28; B23B 2251/287; Y10T 408/905; Y10T 408/906
See application file for complete search history.

(56) References Cited

U.S. PATENT DOCUMENTS

| 4,558,975 A | * | 12/1985 | Hale ............................. 408/186 |
| 5,049,011 A | * | 9/1991 | Bohnet et al. ................. 408/223 |

(Continued)

FOREIGN PATENT DOCUMENTS

| AT | 12700 U1 | * | 8/2012 | ............. B23B 27/14 |
| DE | 10021879 A1 | * | 11/2001 | ............. B23B 51/00 |

(Continued)

OTHER PUBLICATIONS

Translation of Patent JP 60104604 completed by FLS inc. on 20150930.*
International Search Report dated Dec. 18, 2012 issued in PCT counterpart application (No. PCT/KR2012/005764).

*Primary Examiner* — Eric A Gates
*Assistant Examiner* — Donte Brown
(74) *Attorney, Agent, or Firm* — Womble Carlyle

(57) ABSTRACT

A drill tool including a drill body having an inner insert and an outer insert at an end portion of the drill body. The distance from a central axis of the drill body to the outer insert is greater than the distance from the central axis to the inner insert. The cutting edges of the inner and outer inserts can be chamfered with the inner insert chambered at a radially inward portion and the outer insert chamfered at a radially outward portion. The inner insert and the outer insert can be mirror symmetric to one another. The inner insert and the outer insert are mounted to the drill body such that an effective cutting length of the inner insert equals an effective cutting length of the outer insert, the effective cutting lengths being measured in a direction perpendicular to the central axis.

20 Claims, 2 Drawing Sheets

(52) U.S. Cl.
CPC ..... *B23B2200/125* (2013.01); *B23B 2200/204* (2013.01); *B23B 2251/285* (2013.01); *B23B 2251/505* (2013.01); *Y10T 408/905* (2015.01); *Y10T 408/906* (2015.01); *Y10T 408/909* (2015.01)

(56) References Cited

U.S. PATENT DOCUMENTS

| | | | |
|---|---|---|---|
| 5,354,156 A | 10/1994 | Von Haas et al. | |
| 5,971,676 A | 10/1999 | Kojima | |
| 6,039,515 A * | 3/2000 | Lamberg | 408/188 |
| 6,929,432 B2 | 8/2005 | Roman et al. | |
| 7,891,916 B2 | 2/2011 | Takahashi et al. | |
| 8,157,489 B2 * | 4/2012 | Wolf et al. | 408/223 |
| 8,480,337 B2 | 7/2013 | Bae | |
| 2010/0178122 A1 * | 7/2010 | Bae | 408/223 |
| 2010/0329804 A1 | 12/2010 | Okumura | |

FOREIGN PATENT DOCUMENTS

| | | | | |
|---|---|---|---|---|
| JP | 60104604 A * | 6/1985 | | B23B 51/02 |
| JP | 11104911 A * | 4/1999 | | B23B 51/00 |
| JP | 11-235606 | 8/1999 | | |
| JP | 2003-094222 A | 4/2003 | | |
| JP | 2003-165009 | 6/2003 | | |
| WO | WO 03099494 A1 * | 12/2003 | | B23B 51/00 |
| WO | WO 2008/153233 A1 | 12/2008 | | |
| WO | WO 2010/126693 A1 | 11/2010 | | |

* cited by examiner

DRILL TOOL

RELATED APPLICATIONS

This is a 35 USC 371 U.S. National Phase of International Application No. PCT/KR2012/005764, filed 19 Jul. 2012 and published in English as WO 2013/012266A1 on 24 Jan. 2013, which claims priority to Korean application no. 10-2011-0072059, filed 20 Jul. 2011. The contents of the aforementioned applications are incorporated by reference in their entirety.

TECHNICAL FIELD

The present invention generally relates to drill tools, and more particularly to a drill tool with square-shaped indexable inserts for processing small diameter holes in which the ratio of effective cutting edge length of an inner insert to effective cutting edge length of an outer insert satisfies 50:50.

BACKGROUND ART

Generally, a drill tool comprises a cylindrical drill body and two indexable inserts detachably mounted to an end portion of the drill body. The two indexable inserts consist of an inner insert mounted adjacent to a central axis of the drill body and an outer insert mounted adjacent to a periphery of the drill body. Further, they are commonly square-shaped inserts with four cutting edges as shown in FIG. 1. The inner insert and the outer insert are arranged so that the traces of two rotating inserts are overlapped. More specifically, an internal diameter of the circular area of a work piece processed by the inner insert is a bit larger than an external diameter of the ring-shaped area processed by the outer insert.

It is preferable that the ratio of effective cutting edge length of the inner insert to effective cutting edge length of the outer insert satisfies 50:50. Otherwise, vibrations during a processing operation are intensified and may negatively affect the processing performance of the drill due to the imbalanced force transmitted to the drill tool through the inner and outer inserts.

In an indexable insert drill for processing small diameter holes below 14 mm, there is a technical difficulty in realizing the above-mentioned ratio of the effective cutting edge lengths of the inner insert to the outer insert of 50:50 with the conventional square-shaped inserts. The scale of a cemented carbide tool cannot be unlimitedly miniaturized due to its properties. For example, reducing the amount of a material for the size of the insert to be smaller may weaken the insert. Further, the insert should have a space for clamping a screw to fix the indexable insert to the drill body. As such, in designing a drill tool of small diameter with square-shaped inserts with more than the desired size to realize the ratio of the effective cutting edge lengths of the inner insert to the outer insert to be 50:50 as shown in FIG. 1, a diameter of the inscribed circle is 4.5 mm.

A technique used to drill small diameter holes by using rectangular-shaped inserts (rather than square-shaped inserts) to realize the ratio of the effective cutting edge lengths of 50:50 has been provided. It can ensure a sufficient width around a screw hole of the insert and in an end portion of the drill tool to maintain a sufficient stiffness. However, it has drawbacks since the rectangular-shaped insert can only use two cutting edges, whereas the square-shaped insert can use four cutting edges. Further, the strength of the rectangular-shaped insert is inferior to that of the square-shaped insert.

DISCLOSURE OF INVENTION

Technical Problem

The present invention has been formed to address the above problems. Thus, it is the object of the present invention to provide a drilling tool for processing small diameter holes using square-shaped indexable inserts with four cutting edges in which the ratio of the effective cutting edge lengths of the inner to the outer insert satisfies 50:50.

Solution to Problem

A drill tool according to the present invention comprises a drill body having a central axis and an inner insert comprising four cutting edges rotationally symmetric to each other, wherein the inner insert is mounted to an end portion of the drill body adjacent to the central axis, and an outer insert comprising four cutting edges rotationally symmetric to each other, wherein the outer insert is mounted to the end portion of the drill body on the opposite side of inner insert with respect to the central axis, and whose distance from the central axis is farther than that of the inner insert. The cutting edge of the inner insert is chamfered at its radially inward side when mounted in the drill body. The cutting edge of the outer insert is chamfered at its radially outward side when mounted in the drill body. The inner insert and the outer insert are mirror symmetric, and the inner insert and the outer insert are mounted to the drill body such that the ratio of effective cutting edge length of the inner insert to effective cutting edge length of the outer insert satisfies 50:50.

Preferably, according to one embodiment of the drill tool of the present invention, the angle between a radially inward portion of the cutting edge of the inner insert and a plane perpendicular to the central axis is not less than 20° when the inner insert is mounted in the drill body. The angle between the radially inward portion of the cutting edge of the inner insert and the plane perpendicular to the central axis and the angle between the radially outward portion of the cutting edge of the outer insert and the plane perpendicular to the central axis may be the same when the inner insert and the outer insert are mounted in the drill body. Further, the angle between a radially outward portion of the cutting edge of the inner insert and the plane perpendicular to the central axis may be 2° when the inner insert is mounted in the drill body.

According to another embodiment of the drill tool of the present invention, the cutting edge is two-stepped. Further, the ratio of the angles between the intermediate step of the cutting edge of the outer insert and the plane perpendicular to the central axis to the angle between the radially outward portion of the cutting edge of the outer insert and the plane perpendicular to the central axis is within the range of 30% to 50% when the outer insert is mounted in the drill body.

Advantageous Effects of Invention

The inner and outer inserts of the drill tool according to the present invention are chamfered at their radially inward side and radially outward side, respectively, when mounted in the drill body, and arranged in the drill body so that the ratio of the effective cutting edge length of the inner to the outer insert satisfies 50:50. In a drill tool for small diameter holes using square-shaped inserts with four cutting edges, the ratio of the effective cutting edge lengths of the inner to outer inserts of 50:50 can be realized without reducing the size of the inscribed circle of the insert. Thus, it provides outstanding strength and durability by using the square-shaped inserts as well as improved processing performance by realizing the favorable ratio of the effective cutting edge lengths.

MODE FOR THE INVENTION

One embodiment of a drill tool according to the present invention will be described in detail with reference to the accompanying drawings.

Figure 1:
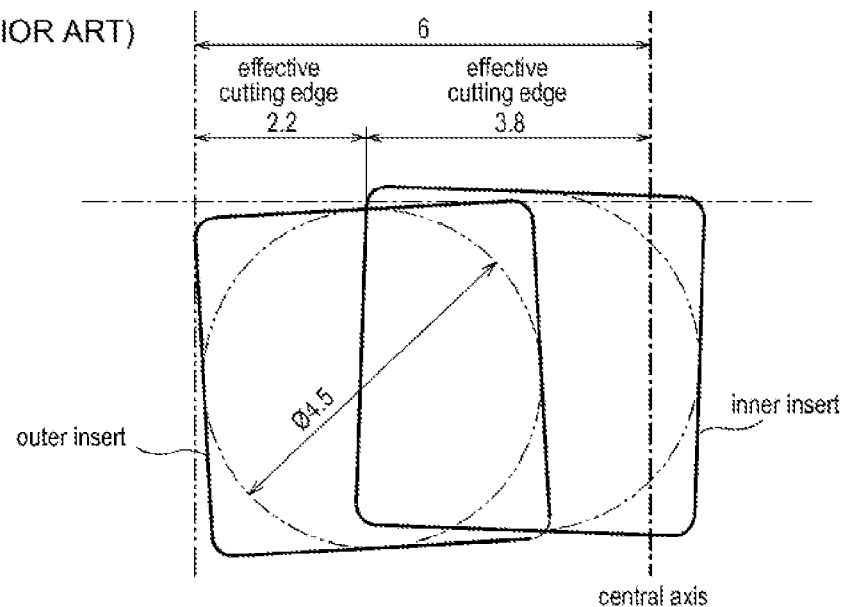
FIG. 1 is a sectional view of a rotational trace of the inner and outer inserts of a conventional drill tool using square-shaped inserts.
Figure 2:
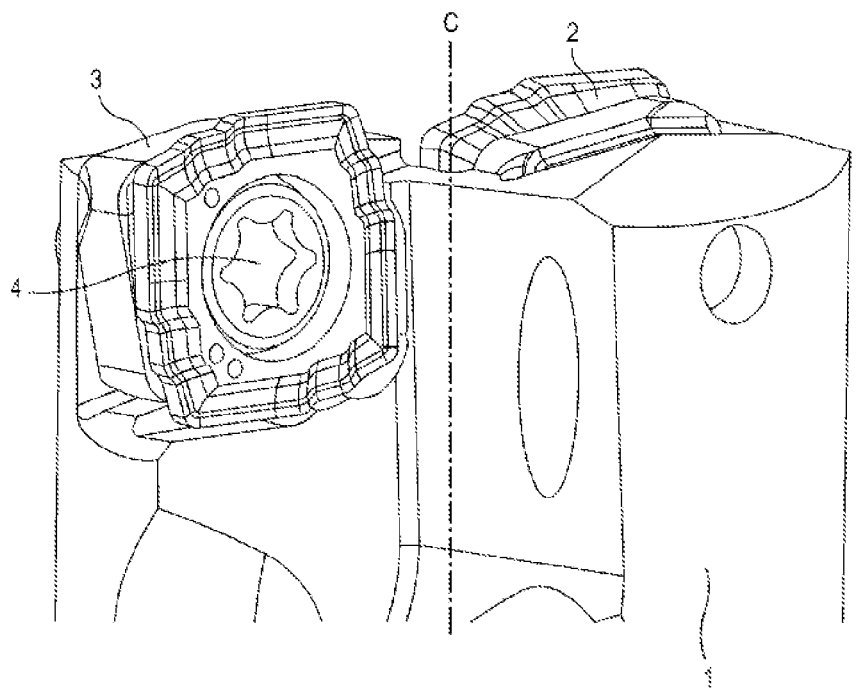
FIG. 2 shows the drill tool assembly of the present invention.

FIG. 2 shows the drill tool assembly of the present invention having a central axis C of rotation which establishes a forward to rear direction. The drill tool includes a drill body 1, and an inner insert 2 and an outer insert 3 mounted to an end portion of the drill body 1. The end portion of the drill body 1 is provided with accommodating recesses for accommodating the inner and outer inserts 2, 3. The accommodating recess for the inner insert 2 is formed adjacent to a central axis C of the drill body 1, whereas the accommodating recess for the outer insert 3 is formed at a distance from the central axis C farther than that of the inner insert 2. Since the accommodating recesses for the inner insert 2 and the outer insert 3 are at opposite side with respect to the central axis C, the inner insert 2 and the outer insert 3 can be arranged such that the respective rotational traces of the inner insert 2 and the outer insert 3 formed by rotating the drill body 1 are partly overlapped each other. The inner and outer inserts 2, 3 each have a penetrating hole at the central portion thereof and can be firmly fixed to the drill body 1 using a screw 4. When the inner and outer inserts 2, 3 are mounted to the drill body 1, one of the cutting edges of each insert 2, 3 projects forwardly from the end portion of the drill body 1. The projecting cutting edge rotates and contacts a work piece to perform cutting machining.

Figure 3:
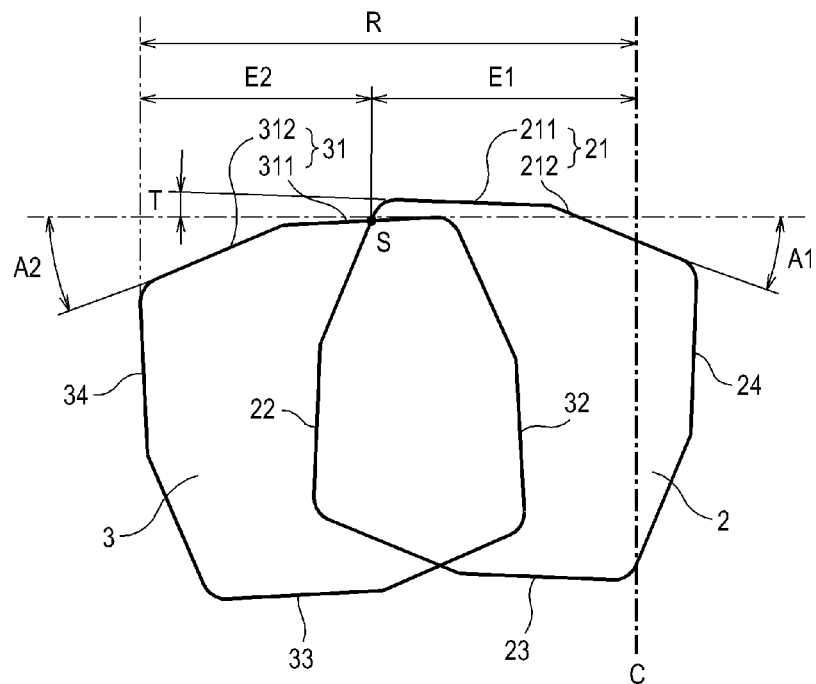
FIG. 3 is a sectional view of a rotational trace of the inner and outer inserts of a drill tool according to one embodiment of the present invention.

FIG. 3 shows the overlapping of rotational traces of the inner and outer inserts 2, 3 of a drill tool according to one embodiment of the present invention. The inner insert 2 is positioned forward of the outer insert 3.

The inner insert 2 has a basically square shape and includes four cutting edges 21, 22, 23, 24 rotationally symmetric to each other. Each of the cutting edges 21, 22, 23, 24, when operative, is chamfered at its radially inward side, i.e., the side of the central axis C, when it is mounted and placed at a position performing cutting. In this embodiment, for example, the cutting edge 21, which is in contact with the work piece during cutting machining, is chamfered at its radially inward side such that the cutting edge 21 is divided into two inwardly and rearwardly inclined portions 211, 212 having different inclination angles from each other. By chamfering, the portion 212 is inclined inwardly by an amount more than that of the portion 211 towards the central axis C.

Since the inner insert 2 is arranged so that the central axis C crosses the inner insert 2, the inner insert 2 contacts the work piece when the drill body 1 rotates and cuts a circular region whose rotating axis is the central axis C.

The outer insert 3 has a basically square shape as the inner insert 2, and includes four cutting edges 31, 32, 33, 34 rotationally symmetric to each other. Since the outer insert 3 and the inner insert 2 are mirror symmetric, each of the cutting edges 31, 32, 33, 34, when operative, is chamfered at its radially outward side, i.e., the opposite side of the central axis C, when it is mounted and placed at a position performing cutting. In this embodiment, for example, the cutting edge 31, which is in contact with the work piece during cutting machining, is chamfered at its radially outward side such that the cutting edge 31 is divided into two portions 311, 312 having different inclination angles from each other. The portion 312 is inclined outwardly by an amount more than that of the portion 311 from the central axis C.

Since the outer insert 3 is disposed distantly from the central axis C, the outer insert 3 contacts the work piece when the drill body 1 rotates and cuts an annular region whose rotating axis is the central axis C.

The inner insert 2 may be arranged such that it is slightly inclined inwardly towards the central axis C. In this embodiment, the inner insert 2 is inclined inwardly towards the central axis C such that the angle T between the radially outward portion 211 of the cutting edge 21, which is performing cutting, and a plane perpendicular to the central axis C is equal to 2 degrees, the radially outward portion 211 being inclined inwardly and rearwardly relative to the central axis C. When performing cutting with the basically square shaped insert, it is advantageous in maintaining a balanced cutting force to make the inner insert 2, which enters and cuts the work piece first, makes an angle of 2 degrees with a horizontal plane.

On the contrary, the outer insert 3 may be arranged such that it is slightly inclined outwardly from the central axis C.

The radius R of a hole formed by drilling is determined by the distance between the central axis C and the farthest point from the central axis C on the cutting edge of the outer insert 3. The cutting region with the radius R consists of a region, which is cut by the inner insert 2 and a region that is cut by the outer insert 3. Among the inner insert 2 and the outer insert 3, the insert that first contacts a part of the cutting region of the work piece cuts the part. As shown in FIG. 3, according to the arrangement of this embodiment, the effective cutting length of the cutting edge performing cutting in the inner insert 2 is E1, which is the distance from the central axis C to the point S where the rotational traces of the inner insert 2 and the outer insert 3 intersect each other. The effective cutting length of the cutting edge performing cutting in the outer insert 3 is E2, which is the distance from the point S to the farthest point from the central axis C on the cutting edge of the outer insert 3. By adjusting the amounts of the inclination angle and the distances from the central axis C of the inner insert 2 and the outer insert 3, the point S where the rotational traces of the inner insert 2 and the outer insert 3 intersect each other can be varied. By doing so, the value of E1:E2, which is the ratio of the effective cutting edge length of the inner insert 2 to the effective cutting edge length of the outer insert 3, is adjusted to satisfy 50:50. That is, since the inner insert 2 and the outer insert 3 are chamfered at the side of the central axis C and at the side away from the central axis C, respectively, and the chamfered cutting edge portions 212, 312 form a relatively large angle with the plane perpendicular to the central axis C, it is possible to adjust the ratio of the effective cutting lengths to be nearly 50:50. As seen in the figures, the effective cutting length is measured in a direction perpendicular to the central axis C.

According to the present invention, in a drill tool for small diameter, for example, from 12 to 14 mm, holes using square-shaped inserts with four cutting edges, the ratio of the effective cutting edge lengths of the inner to outer inserts of 50:50 can be realized such that it is possible to balance the forces transmitted via the inner and outer inserts 2, 3 to the drill. As such, square-shaped inserts having outstanding strength and durability can be used to drill small diameter holes. Further, realizing the favorable ratio of the effecting cutting lengths reduces the vibration caused in cutting machining, thereby improving processing performance.

In this embodiment, an angle A1 between the radially inward portion 212 of the cutting edge 21 of the inner insert 2 and the plane perpendicular to the central axis C satisfies 20 degrees. In cutting machining, the inner insert 2 may cause interferences as the feed increases. However, by designing the angle A1 to be equal to or more than 20 degrees, this type of interferences can be prevented.

Further, in this embodiment, an angle A2 between the radially outward portion 312 of the cutting edge 31 of the outer insert 3 and the plane perpendicular to the central axis C has the same value as the angle A1. It is preferable to form the angles A1 and A2 to have substantially the same non-zero value such that the inner insert 2 and the outer insert 3 are arranged in a symmetrical structure to thereby maintain balance in cutting with the inner insert 2 and cutting with the outer insert 3.

Hereinafter, another embodiment of a drill tool according to the present invention will be described in detail with reference to the accompanying drawings.

Figure 4:
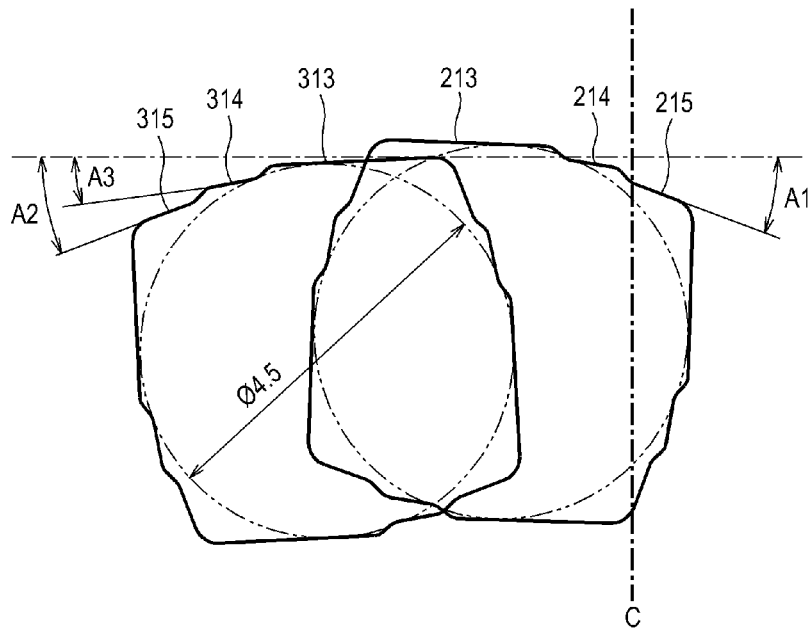
FIG. 4 is a sectional view of a rotational trace of the inner and outer inserts of a drill tool according to another embodiment of the present invention.

FIG. 4 shows the overlapping of rotational traces of the inner and outer inserts 2, 3 of a drill tool according to another embodiment of the present invention.

In this embodiment, the cutting edges of the inner and outer inserts 2, 3 are chamfered at a side of the central axis C and at a side away from the central axis C, respectively. The cutting edge 21 of the inner insert 2 is two-stepped and divided into three steps of portions 213, 214, 215 to form a stairway shape. Similarly, the cutting edge 31 of the outer insert 3 is two-stepped and divided into three steps of portions 313, 314, 315 to form a stairway shape. The chamfered region does not intrude into the inscribed circle of the square such that the inscribed circle after the chamfering has the same size as the inscribed circle before chamfering.

In the drill tool to which the present invention is applied, cutting operation is performed by an external cutting edge. In particular, when the outer insert enters for cutting, the cutting force is always concentrated in one side, and it is difficult to obtain a desired hole diameter. Further, when the angle A2 has a large value, the balance of the cutting force cannot be maintained. Accordingly, in this embodiment, the cutting edge 31 is designed to be two-stepped and an intermediate step 314, which forms an angle A3 between the plane perpendicular to the central axis C, is added radially inward of the angle A2 such that the cutting force is spread and the effect of large angle A2 is compensated. It also facilitates the segmentation of a chip in cutting machining. In particular, when the angle A3 is of 30% and 50% of the angle A2, such an effect is maximized.

It is to be understood that the aforementioned embodiments of the present invention have been described by way of illustration and are not intended to limit the present invention. Numerous variations and modifications can be made without departing from the spirit of the present invention by those of ordinary skilled in the art.

The invention claimed is:

1. A drill tool, comprising:
   a drill body having a central axis defining a forward to rear direction;
   an inner insert comprising four cutting edges rotationally symmetric to each other, wherein the inner insert is mounted to an end portion of the drill body adjacent to the central axis; and
   an outer insert comprising four cutting edges rotationally symmetric to each other, wherein the outer insert is mounted to the end portion of the drill body on an opposite side of the inner insert with respect to the central axis, and whose distance from the central axis is farther than that of the inner insert;
   wherein a radially inward side of the cutting edge of the inner insert is chamfered such that a non-zero angle is formed between said radially inward side and a plane perpendicular to the central axis;
   wherein a radially outward side of the cutting edge of the outer insert is chamfered such that a non-zero angle is formed between said radially outward side and said plane perpendicular to the central axis;
   wherein the inner insert and the outer insert are mirror symmetric to one another; and
   wherein the inner insert and the outer insert are mounted to the drill body such that the ratio of an effective cutting edge length of the inner insert to an effective cutting edge length of the outer insert satisfies 50:50, the effective cutting lengths being measured in a direction perpendicular to the central axis.

2. The drill tool of claim 1, wherein the angle between a radially inward portion of the cutting edge of the inner insert and a plane perpendicular to the central axis is not less than 20 degrees when the inner insert is mounted in the drill body.

3. The drill tool of claim 1, wherein the cutting edge of the inner insert and the cutting edge of the outer insert are two-stepped.

4. The drill tool of claim 3, wherein the ratio of:
   the angle between an intermediate step of the cutting edge of the outer insert and the plane perpendicular to the central axis, to
   the angle between a radially outward portion of the cutting edge of the outer insert and the plane perpendicular to the central axis is within a range of 30% to 50% when the outer insert is mounted in the drill body.

5. The drill tool of claim 1, wherein the angle between a radially outward portion of the cutting edge of the inner insert and the plane perpendicular to the central axis is 2° when the inner insert is mounted in the drill body, said radially outward portion being inclined inwardly and rearwardly, relative to the central axis.

6. The drill tool of claim 1, wherein the non-zero angle between a radially inward portion of the cutting edge of the inner insert and the plane perpendicular to the central axis and the non-zero angle between a radially outward portion of the cutting edge of the outer insert and the plane perpendicular to the central axis are identical when the inner insert and the outer insert are mounted in the drill body.

7. A drill tool, comprising:
   a drill body having a central axis defining a forward to rear direction;
   an indexable inner insert mounted to an end portion of the drill body adjacent to the central axis; and
   an indexable outer insert mounted to the end portion of the drill body on an opposite side of the central axis as the inner insert with respect to the central axis, the outer insert being further from the central axis than the inner insert;
   wherein the inner insert and the outer insert are mounted to the drill body such that the ratio of an effective cutting length of the inner insert to an effective cutting length of the outer insert satisfies substantially 50:50, the effective cutting lengths being measured in a direction perpendicular to the central axis; and wherein the inner insert and the outer insert are mirror symmetric to one another.

8. The drill tool according to claim 7, wherein:
the inner insert comprises four rotationally symmetric cutting edges; and
the outer insert comprises four rotationally symmetric cutting edges.

9. The drill tool according to claim 7, wherein, when mounted on the tool body,
the at least one cutting edge of the inner insert is chamfered at a radially inward portion thereof to create a leading surface and a chamfered surface;
the at least one cutting edge of the outer insert is chamfered at a radially outward portion thereof to create a leading surface and a chamfered surface; and
the leading surface of the inner insert is inclined inwardly and rearwardly, relative to the central axis.

10. The drill tool according to claim 9, wherein, when the inner insert is mounted on the drill body,
an angle between the chamfered surface of the inner insert and a plane perpendicular to the central axis is not more than 20 degrees.

11. The drill tool according to claim 9, wherein, when the inner insert is mounted on the drill body,
the inner insert is slightly inclined inwardly toward the central axis.

12. The drill tool according to claim 11, wherein, when the inner insert is mounted on the drill body,
an angle between the leading surface of the inner insert and a plane perpendicular to the central axis is approximately 2 degrees.

13. The drill tool according to claim 11, wherein, when the outer insert is mounted on the drill body,
the outer insert is slightly inclined outwardly away from the central axis.

14. The drill tool according to claim 9, wherein, when mounted on the drill body,
an angle between the chamfered surface of the inner insert and a plane perpendicular to the central axis equals an angle between the chamfered surface of the outer insert and the plane perpendicular to the central axis.

15. The drill tool according to claim 9, wherein the chamfered surface of at least the outer insert is stepped to define at least an intermediate surface and a radially outer surface.

16. The drill tool according to claim 15, wherein, when mounted on the drill body,
the intermediate surface forms a first angle with a plane perpendicular to the central axis; and
the radially outer surface forms a second angle with the plane perpendicular to the central axis,
wherein the first angle is between about 30% to about 50% of the second angle.

17. A drill tool, comprising:
a drill body having a central axis defining a forward to rear direction;
a radially inner insert mounted to an end portion of the drill body adjacent to the central axis, the inner insert being four-way rotationally symmetric; and
a radially outer insert mounted to the end portion of the drill body on an opposite side of the central axis as the inner insert with respect to the central axis, the outer insert being further from the central axis than the inner insert, the outer insert being four-way rotationally symmetric;
wherein the inner insert and the outer insert are mounted to the drill body such that an effective cutting length of the inner insert is equal to an effective cutting length of the outer insert, the effective cutting lengths being measured in a direction perpendicular to the central axis; and
wherein the inner insert and the outer insert are mirror symmetric to one another.

18. The drill tool of claim 17, wherein:
a radially inward portion of the cutting edge of the inner insert is inclined inwardly and rearwardly at a first angle (A1), relative to the central axis; and
a radially outward portion of the cutting edge of the inner insert is inclined inwardly and rearwardly, at a second angle (T), relative to the central axis.

19. The drill tool of claim 18, wherein:
the first angle (A1) is not less than 20 degrees.

20. The drill tool of claim 19, wherein:
the second angle (T) is 2 degrees.

* * * * *